United States Patent
Zaccaria et al.

(10) Patent No.: US 10,116,488 B2
(45) Date of Patent: Oct. 30, 2018

(54) SYSTEM FOR ANALYZING AN INDUSTRIAL CONTROL NETWORK

(71) Applicant: Rockwell Automation Technologies, Inc., Mayfield, OH (US)

(72) Inventors: Joseph M. Zaccaria, Brookfield, WI (US); Matthew A. Hermans, Saukville, WI (US); Raymond A. Spangler, Bakersfield, CA (US); Evan J. Kausalik, Appleton, WI (US); Javier Medina, Menomonee Falls, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 250 days.

(21) Appl. No.: 14/991,021

(22) Filed: Jan. 8, 2016

(65) Prior Publication Data

US 2016/0127207 A1 May 5, 2016

Related U.S. Application Data

(63) Continuation-in-part of application No. 14/510,797, filed on Oct. 9, 2014, now Pat. No. 9,811,072.

(51) Int. Cl.
*G06F 15/177* (2006.01)
*H04L 29/12* (2006.01)
(Continued)

(52) U.S. Cl.
CPC .... *H04L 29/12113* (2013.01); *G05B 19/0428* (2013.01); *G06F 21/577* (2013.01);
(Continued)

(58) Field of Classification Search
CPC ........... H04L 29/12113; H04L 61/1541; H04L 63/1425; H04L 9/3273; G05B 19/0428; G06F 21/577; G06F 21/552
(Continued)

(56) References Cited

U.S. PATENT DOCUMENTS 5,452,201 A 9/1995 Pieronek et al.
7,596,095 B2 9/2009 Chen et al.
(Continued)

FOREIGN PATENT DOCUMENTS

EP 3007386 A1 4/2016
WO 2013184117 A1 12/2013

OTHER PUBLICATIONS

EP Search Report for Application No. 15 188 089.5; dated Feb. 3, 2017.
(Continued)

*Primary Examiner* — Kyung H Shin
(74) *Attorney, Agent, or Firm* — Boyle Fredrickson, S.C.

(57) ABSTRACT

A system may be provided in which an industrial control network may be discovered and characterized such that useful networking data may be presented to a user and/or monitored for events. By configuring an interrogator device to send a "generic" message to ranges of network locations, presences of devices at particular locations may be determined. The generic message may direct any of numerous devices types to provide a response including multiple parameters. The interrogator may store such parameters in "data records," and may advantageously send periodic collections of data records, or "data sets," to a processing manager. The processing manager, in turn, may communicate with one or more data structures to format, enrich and/or monitor the networking data to more conveniently and reliably capture and maintain networks and connected devices.

18 Claims, 13 Drawing Sheets

(51) Int. Cl.
  *H04L 12/26* (2006.01)
  *G06F 21/57* (2013.01)
  *G05B 19/042* (2006.01)
  *H04L 12/24* (2006.01)

(52) U.S. Cl.
  CPC ........ *H04L 43/045* (2013.01); *H04L 61/1541* (2013.01); *H04L 41/0659* (2013.01); *H04L 41/0816* (2013.01); *H04L 43/18* (2013.01)

(58) Field of Classification Search
  USPC .......................................................... 709/222
  See application file for complete search history.

(56) References Cited

U.S. PATENT DOCUMENTS

| | | | |
|---|---|---|---|
| 7,725,528 | B1 | 5/2010 | Zink et al. |
| 8,156,232 | B2 | 4/2012 | Callaghan et al. |
| 2003/0236860 | A1 | 12/2003 | Yegin |
| 2007/0058929 | A1 | 3/2007 | Chaffee |
| 2007/0073850 | A1 | 3/2007 | Callaghan et al. |
| 2007/0168571 | A1 | 7/2007 | Ramsey et al. |
| 2007/0186011 | A1 | 8/2007 | Batke et al. |
| 2007/0237141 | A1 | 10/2007 | Marchese |
| 2009/0037872 | A1 | 2/2009 | Schnabele et al. |
| 2009/0222541 | A1* | 9/2009 | Monga .............. H04L 29/12113 709/222 |
| 2010/0298955 | A1 | 11/2010 | Grgic et al. |
| 2011/0060427 | A1 | 3/2011 | Batke et al. |
| 2013/0212574 | A1 | 8/2013 | Hutchinson et al. |
| 2013/0345829 | A1* | 12/2013 | Garg .................. G05B 19/0428 700/9 |
| 2015/0156285 | A1 | 6/2015 | Blair |
| 2015/0161394 | A1* | 6/2015 | Ferragut ............... G06F 21/577 726/25 |

OTHER PUBLICATIONS

Extended European Search Report; Application No. 15188089.5.
Rockwell Automation; System Ferret; Website, www.rockwellautomation.com/solutions/integratedarchitecture/resources4; 2012; US.
Rockwell Automation; "The Common Industrial Protocol (CIP) and the Family of CIP Networks; Publication;" Copyright 2006, Open DeviceNet Vendor Association, Inc.; p. 1-84; US.
Rockwell Automation Publication; "Logix8000 Controllers Add-On Instructions,"; Programming Manual; 1756-PM010E-EN-P, Sep. 2012; p. 1-98; US.
Extended European Search Report dated Jun. 20, 2017; Application No. 17150084.6—(12) pages.
European Examination Report for Application No. 15 188 089.5; dated May 24, 2017.
Sematech; "Failure Reporting, Analysis and Corrective Action System"; 1993, p. 1-14.

* cited by examiner

FIG. 16

| Events Faults And Exce.. ☒ | Assets Master ☒ | | | | | |
|---|---|---|---|---|---|---|
| DRBox Id | Event Name | Event Type | Event Group | Priority | Avg MilliSeconds |
| DRTool | Faulted Processor Past | Fault | FaultChange | | 0 |
| DRTool | MinorFltFlag | Fault | FaultChange | 1 | 68 |
| DRTool | MjrFltFlag | Fault | FaultChange | 1 | 49 |
| DRTool | KeySwitch | Fault | FaultChange | 1 | 29 |
| DRTool | Faulted Processor | Fault | FaultChange | 1 | 19 |
| DRTool | Inactive1Hour | Inactive | InactiveAsset | 1 | 19 |
| DRTool | HrsBeforeInactive | Inactive | InactiveAsset | 2 | 6 |
| DRTool | FeneralFault | Fault | FaultChange | 2 | 24 |
| DRTool | Inactive2Months | Inactive | InactiveAsset | 2 | 6 |
| DRTool | InactiveOverNormal | Inactive | InactiveAsset | 2 | 8 |
| DRTool | Rev | Config | ConfigurationChange | 3 | 59 |
| DRTool | NewAssetId | New | NewAsset | 3 | 2 |
| DRTool | IPAddress | ID | IdentificationChange | 4 | 23 |
| ● | ● | ● | ● | ● | ● |
| ● | ● | ● | ● | ● | ● |
| ● | ● | ● | ● | ● | ● |

SYSTEM FOR ANALYZING AN INDUSTRIAL CONTROL NETWORK

CROSS-REFERENCE TO RELATED APPLICATION

This application is a continuation in part of U.S. patent application Ser. No. 14/510,797, filed on Oct. 9, 2014, entitled "Apparatus and Method for Analyzing a Control Network," the contents of which is hereby incorporated by reference.

BACKGROUND OF THE INVENTION

The present invention relates to industrial control networks, and in particular, to a system and method for analyzing an industrial control networks and connected devices.

Industrial controllers, such as Programmable Logic Controllers (PLC's), are specialized electronic computer systems used for the control of industrial processes or machinery, for example, in a factory environment. Industrial controllers differ from conventional computers in a number of ways. Physically, they are constructed to be substantially more robust against shock and damage and to better resist external contaminants and extreme environmental conditions. The processors and operating systems are optimized for real-time control and execute languages allowing ready customization of programs to comport with a variety of different controller applications. Industrial controllers may have a user interface for accessing, controlling and/or monitoring the industrial controller, such as through a locally or remotely connected terminal(s) having a keyboard, mouse and display.

Typically, industrial controllers have a highly modular architecture that allows different numbers and types of network cards or adapters to be used to connect the controllers to the process or machinery to be controlled through special "control networks" suitable for highly reliable and available real-time communication. Such control networks commonly used in industrial control systems include, for example, ControlNet, DeviceNet, EtherNet/IP and Sercos, whose specifications are published and whose protocols are used broadly by a number of manufacturers and suppliers. Control networks differ from standard communication networks, such as Ethernet, by guaranteeing maximum communication delays. This may be obtained, for example, by pre-scheduling the bandwidth of the network and/or providing redundant communication capabilities to high-availability. Control networks also differ from one another in physical aspects, for example, the type of media (e.g., co-axial cable, twisted pair, light fiber, wireless communications, etc.), the protocols of its operation, (e.g., Baud rate, number of channels, word transmission size, use of connected messaging, solicited and unsolicited messaging, etc.) and how the data is formatted and how it is collected into standard messages.

As part of their enhanced modularity, industrial controllers may employ one or more industrial devices coupled through the control networks. Industrial devices may comprise one or more I/O modules, AC/DC drives, motion drives or other hardware devices dedicated to a particular type of industrial function, for example, detecting input AC or DC signals or controlling output AC or DC signals in conjunction with an industrial process, or running motors or other machinery. Each I/O module or drive may have a connector system allowing them to be installed in different combinations in an industrial device along with other selected I/O modules or drives to match the demands of the particular application. Multiple industrial devices may be located at convenient control points near the controlled process or machine to communicate with the industrial controller via the control network.

Industrial controllers and/or industrial devices may be added, removed and/or updated periodically throughout a factory environment. For example, a new industrial process may be added via a new industrial device to increase the capability or the capacity of the industrial system. Similarly, an existing industrial controller and/or industrial device in an industrial system may be modified to include updated hardware or updated firmware. In some applications, industrial controllers and/or industrial devices must also be added, removed and/or updated while the industrial system is actively running. This may occur, for example, when interrupting the process would cause costly downtime and/or product defects. Consequently, the industrial system may typically change over time and throughout physically dispersed areas throughout the operating geography or in the factory.

U.S. patent application Ser. No. 13/528,198, titled "Industrial Hardware Installation Base Reporting and Failure Monitoring." assigned to the present assignee and incorporated herein by reference in its entirety, discloses an apparatus and method for automatically retrieving installation information for devices in a network. Here, installation information for a system, including device name, hardware area location including node number or IP address, serial number, manufacturing date, product type, device code, hardware description, firmware revision, major and minor fault flag, slot number and important condition monitoring parameters, may be automatically found in the system.

However, without sufficiently characterizing such determined networking data, the utility of collecting such data may be unduly limited. Consequently, what is needed is an improved system for discovering and characterizing networking data, such that the determined network may convey useful information to operators and/or administrators seeking to ensure maximum efficiency.

SUMMARY OF THE INVENTION

The present inventors have recognized that by isolating and applying a common protocol which may be used by multiple devices across multiple network levels, a more rapid and less intrusive analysis of an entire system of control networks may be provided. A generic, unsolicited message may be sent individually to targeted addresses across a network level. If a response is received from a device at a targeted address, such as within a timeout period, a specific message customized to the individual device may be sent to extract further detail about the device, including its connectivity to other devices and networks. The system may continue automatically until all devices on the network have been interrogated and the resource utilization of the entire system is determined to thereby provide diagnostic and reliability services.

Common Industrial Protocol (CIP) is a media independent industrial protocol for industrial automation applications supported by the Open DeviceNet Vendors Association (ODVA). CIP is described in "The Common Industrial Protocol (CIP) and the Family of CIP Networks," Copyright 2006, Open DeviceNet Vendor Association, Inc., which document is incorporated herein by reference in its entirety. The present inventors have recognized that all CIP compliant devices, regardless of manufacturer, support and respond to a generic CIP message requesting a device's CIP Identity Object. The CIP Identity Object, in turn, may be used to obtain attributes for asset inventorying.

CIP encompasses a comprehensive suite of messages and services for the collection of manufacturing automation applications, including control, safety, synchronization, motion, configuration and other information. Application extensions to CIP include CIP Safety, providing a communication between nodes such as safety I/O blocks, safety interlock switches, safety light curtains and safety PLCs in safety applications up to Safety Integrity Level (SIL) 3 according to IEC 61508 standards, CIP Motion, allowing integration of field devices and motion drives on the same network thereby eliminating the need for a separate motion optimized network, and CIP Sync, a time synchronization extension to CIP based on the recent IEEE-1588 standard—Precision Clock Synchronization Protocol for Networked Measurement and Control Systems—providing increased control coordination for sequencing demanding events recording, distributed motion control and other distributed applications. CIP maximizes compatibility among devices in an industrial system, and typical control networks implementing CIP include EtherNet/IP, DeviceNet, ControlNet and similar networks whose specifications are published and whose protocols are used broadly by a number of manufacturers and suppliers.

CIP explicit messages contain addressing and service information that directs a receiving device to perform a certain service (action) on a specific part (e.g., an attribute) of a device. A generic CIP explicit message, such as a Studio 5000 Logix Designer (available from Rockwell Automation, Inc.) programmed "RSWho" message (also referenced as "Device WHO"), may be sent individually to targeted addresses in a network to seek device type information. If no response is received with a timeout period, the system may simply move on to the next address. However, if a response is received identifying a device type, such as, for example, a CIP identity object identifying an attribute, then a library may be consulted to send a second message specific to the device type to extract maximum detail from the device, including attributes for Vendor ID, Device Type, Product Code, Revision, Status, Serial Number, Product Name, State, Configuration Consistency Value, Heartbeat Interval, and/or Languages Supported, as well as hardware area location including node number or IP address, manufacturing date, product type, device code, hardware description, firmware revision, serial number, major and minor fault flag, slot number and important condition monitoring parameters, and so forth.

Accordingly, data may be collected and stored within a data structure to enable direct interrogation of any connected devices. Such interrogation can occur on-demand.

Specifically then, the present invention, in one embodiment, provides a module for analyzing an industrial control network comprising: a library data structure relating messages to a plurality of device types; a communication interface for communicating with a device in the control network; and an electronic processor executing a program stored in a non-transitory computer-readable storage medium. The processor may execute to: (a) send a first communication to a target location in the control network via the communication interface, wherein the first communication includes a message configured to be processed by any of the device types, and wherein the first communication directs a device to provide information for identifying its device type; (b) receive a response via the communication interface from a device at the target location, wherein the response provides information identifying its device type; and (c) send a second communication to the device via the communication interface, wherein the second communication includes a message configured to be processed by a subset of the device types that includes the identified device type, and wherein the second communication directs the device to provide a data value or range of data values.

The present invention, in another embodiment, provides a method of analyzing an industrial control network using a library data structure relating messages to a plurality of device types. The method may comprise: (a) sending a first communication to a target location in a control network via a communication interface, wherein the first communication includes a message configured to be processed by any of the device types, and wherein the first communication directs a device to provide information for identifying its device type; (b) receiving a response via the communication interface from a device at the target location, wherein the response provides information identifying its device type; and (c) sending a second communication to the device via the communication interface, wherein the second communication includes a message configured to be processed by a subset of the device types which includes the identified device type, and wherein the second communication directs the device to provide a data value.

In another aspect of the invention, a system may be provided in which an industrial control network may be discovered and characterized such that useful networking data may be presented to a user and/or monitored for events. By configuring an interrogator device to send a "generic" message to ranges of network locations, presences of devices at particular locations may be determined. The generic message may direct any of numerous devices types to provide a response including multiple parameters. The interrogator may store such parameters in "data records," and may advantageously send periodic collections of data records, or "data sets," to a processing manager. The processing manager, in turn, may communicate with one or more data structures to format, enrich and/or monitor the networking data to more conveniently and reliably capture and maintain the network.

The present invention in another aspect provides a system for analyzing an industrial control network. The system may include: an interrogator having a network interface configured to communicate with a plurality of device types, the interrogator being operable to send a message readable by each of the plurality of device types, the message being configured to direct a device to provide a response including a plurality of parameters, the interrogator being further operable to send the message to a plurality of network locations to determine presence of a device; and a processing manager in communication with the interrogator. The processing manager may execute a program stored in a non-transient medium operable to: (a) receive a plurality of data records from the interrogator, each data record including a plurality of parameters for a device providing a response, the plurality of data records forming a data set; and (b) format the data set by populating a plurality of predetermined fields for each data record, the plurality of predetermined fields including a first field indicating a parameter for a device of a data record and a second field indicating a network location for the device of the data record.

The present invention, in another aspect, provides a method for analyzing an industrial control network including an interrogator having a network interface configured to communicate with a plurality of device types, the interrogator being operable to send a message readable by each of the plurality of device types, the message being configured to direct a device to provide a response including a plurality of parameters, the interrogator being further operable to send the message to a plurality of network locations to determine presence of a device, and a processing manager in communication with the interrogator. The method may include: (a) receiving a plurality of data records from the interrogator, each data record including a plurality of parameters for a device providing a response, the plurality of data records forming a data set; and (b) formatting the data set by populating a plurality of predetermined fields for each data record, the plurality of predetermined fields including a first field indicating a parameter for a device of a data record and a second field indicating a network location for the device of the data record.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

Figure 16:
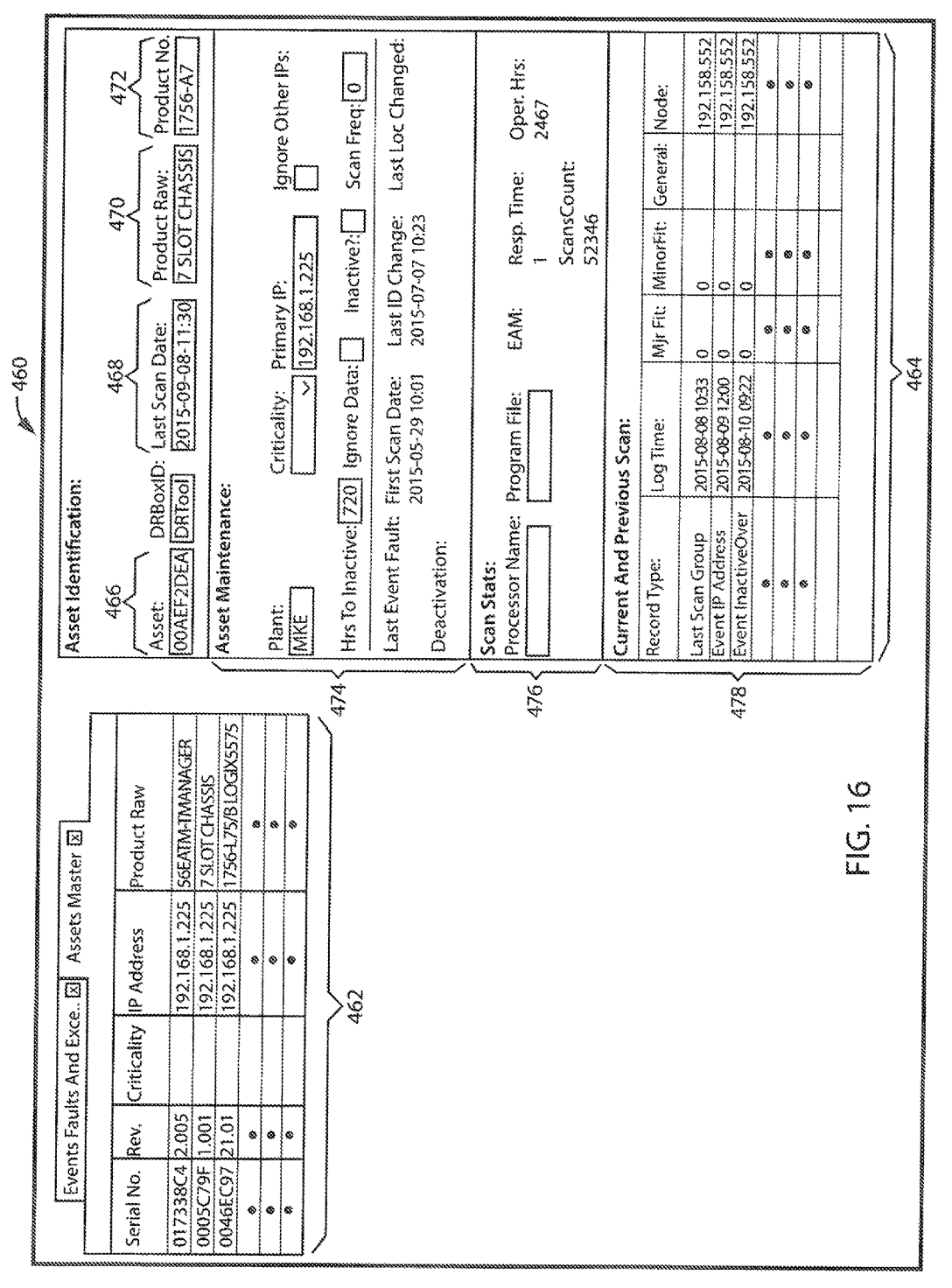

FIG. 16 is a graphical display for illustrating networking data in an aspect of the present invention;

FIG. 17 is a graphical display for illustrating event monitoring in an aspect of the present invention.

DETAILED DESCRIPTION OF THE PREFERRED EMBODIMENT

Figure 1:
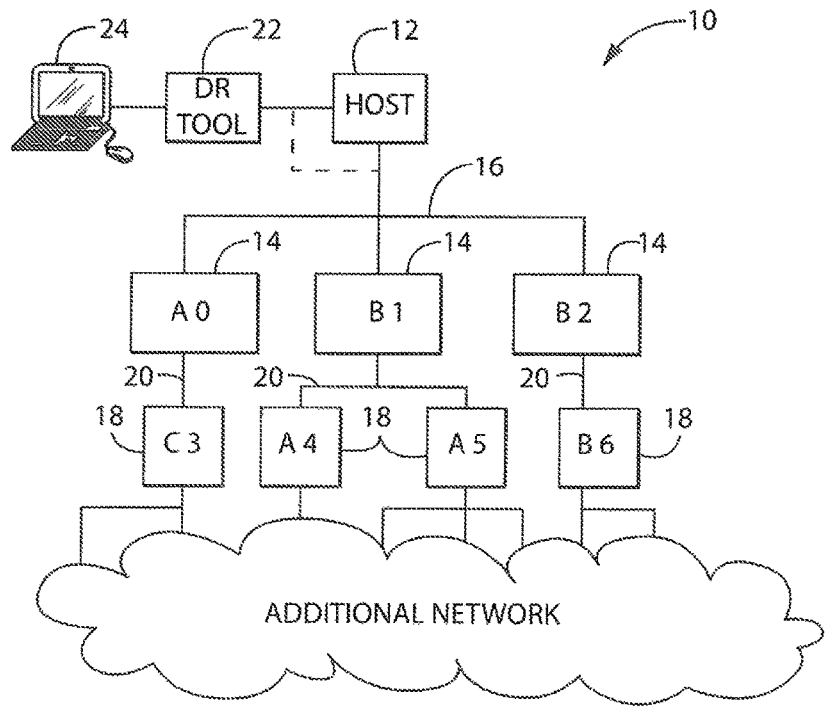
FIG. 1 is a simplified diagram of an industrial control network system in accordance with an embodiment of the present invention.

Referring now to FIG. 1, a simplified diagram of an exemplar industrial control network system 10 is provided in accordance with an embodiment of the present invention. The system 10 may comprise a selected host device 12 connected to one or more first level devices 14 via a first level network 16. Each of the first level devices 14 may, in turn, connect to one or more second level devices 18 via one or more second level networks 20. Similarly, each of the second level devices 18 may, in turn, connect to one or more third level devices via one or more third level networks, and so forth (additional network). Accordingly, the control network system 10 may expand to a vast number of network devices via multiple network levels. The host device 12 may be any part of the system 10 selected as an entry-point to the network, such as a network traffic device, switch, router, gateway or other device which may provide an IP address. Accordingly, the host device 12 does not form a part of the diagnostic and reliability (DR) system or tool itself.

The network devices, including the selected host device 12, the first level devices 14 and the second level devices 18, may each be network compatible devices, such as Programmable Logic Controllers (PLC's) or other industrial controllers or devices. The network devices may implement a control network protocol, such as ControlNet, DeviceNet, EtherNet/IP or SERCOS. Accordingly, the network levels, including the first level network 16, the second level networks 20, and so forth, could each be control networks, such as ControlNet, DeviceNet, EtherNet/IP or SERCOS network types.

Moreover, the differing network levels may implement different network types. For example, the first level network 16 may implement an EtherNet/IP network, whereas the second level networks 20 (and beyond) may variously implement ControlNet, DeviceNet or SERCOS networks. In embodiments, one or more of the network devices on the various network levels may be used to control processes and/or machinery in automation environments, such as by controlling industrial devices which control sensors and actuators, including as described in U.S. patent application Ser. No. 13/528,198, titled "Industrial Hardware Installation Base Reporting And Failure Monitoring," incorporated herein by reference in its entirety.

Although the network levels may differ by network types, the network levels may nevertheless implement a common protocol between them at a higher level of abstraction, such as Common Industrial Protocol (CIP), as described in "The Common Industrial Protocol (CIP) and the Family of CIP Networks," Copyright 2006, Open DeviceNet Vendor Association, Inc., which document is incorporated herein by reference in its entirety. Accordingly, the common protocol may be used to communicate between network devices on different network levels, which may also be of different network types.

A diagnostic and reliability (DR) system or tool 22 may be used for automatically analyzing and determining resources of the system 10 and provide diagnostic and reliability services accordingly. The DR tool 22 may be coupled to the control network system 10 via the selected host device 12, or alternatively, via the first level network 16. If coupled to the selected host device 12, the DR tool 22 may send and receive communications through the selected host device 12. Alternatively, if coupled to the first level network 16, the DR tool 22 may send and receive communications with other network devices as another network device in the system. The DR tool 22 is provides a complete system, including interrogation, data transfer and analytical layers, independent of the selected host 12 and remaining network to be analyzed.

In embodiments, the DR tool 22 may be implemented as a PLC or other industrial controller or device. In addition, the DR tool 22 may be coupled to a Database/Database Transaction Manager and Human Machine Interface (HMI) 24 providing, for example, a monitor, keyboard, mouse and/or other wired or wireless I/O functionality as known in the art. The Database/Database Transaction Manager may be operable to receive raw data and process or convert such data for network analysis. In embodiments, the Database/Database Transaction Manager may be integrated with, or distributed among, the DR Tool 22, the HMI 24 and/or other wired or wirelessly connected hardware. For example, a transaction manager and data logger element may be integrated within the DR Tool 22 with a database in a separate host device. Alternatively, the DR Tool 22 could include a transaction manager and data logger with a database in a separate host device. Alternatively, multiple DR Tools 22, or processing elements thereof, could each include transaction managers and data loggers transferring data into a common database, which common database could be in a separate host device. Accordingly, it will be appreciated that a variety of distributed computing options may be available without departing from the spirit of the invention.

In operation, the DR tool 22 may send, such as via the selected host device 12, a first communication to a target location in the first level network 16. Target locations may be based on a possible range of Internet Protocol (IP) addresses, node addresses, Media Access Control (MAC) addresses, and/or other addressing scheme, and could begin with the lowest possible address, incrementing toward the highest possible address. The first communication may include a generic message configured to be processed by multiple device types, such as device types "A," "B" or "C." The first communication may direct a device, if present at a target location, to provide information for identifying its particular device type. To conserve bandwidth in the system 10, the first communication may be a CIP explicit message or a unicast message with only one receiver at one target location. If no response is received within an adjustable predetermined timeout period, such as thirty (30) seconds, or more preferably three (3) seconds, the DR tool 22 may simply send a first communication to a next address (or first communication to a next series of addresses). If a response is received from a device at the target location, such as within the timeout period, the DR tool 22 may reference a library to send a specific message customized to the identified individual device to extract greater detail about the device, including its connectivity to other devices and networks. Accordingly, the second communication may include a message configured to be processed by a subset of the device types that includes the identified device type.

For example, at a particular target location or address, after sending a first (generic) communication, the DR tool 22 may receive a response from a first level device 14 on the first level network 16 identifying itself as a device type "A," illustrated as instance "A0." The DR tool 22 may then generate a tag based on the device type and reference a library data structure relating messages to a device types, then send a second (specific) communication to the first level device 14 that includes a message configured to be processed by a subset of the device types that includes the identified device type A. The second communication is designed to extract more detailed information about the network device. Moreover, a CIP Connection ID may be established upon receipt of a response to the first communication, and the second communication may be sent using the CIP Connection ID. The DR tool 22 may then continue its analysis of the first level network 16, perhaps finding an identified device type "B" at another target location or address, illustrated as instance "B1" and then another device type B at yet another target location or address, illustrated as instance "B2."

After identifying the selected host device 12 and all of the first level devices 14 on the first level network 16, and upon extracting detail about the selected host device 12 and the first level devices 14 via data values from the selected host device 12 and the first level devices 14, the DR tool 22 may systematically proceed to the second level networks 20, sequentially or in parallel. For Example, the DR tool 22 may proceed sequentially, beginning with the second level network 20 connected to the network device A0. In doing so, the DR tool 22 may send a third (generic) communication to a target location in the second level network 20, via the network device A0, and await a response, similarly as described with respect to the first level network 16. Accordingly, the DR tool 22 may find a second level device 18, identified as a device type "C," at a target location or address, illustrated as instance "C3," which may be the only network device connected to the network device A0. The DR tool may then send a fourth (specific) communication to extract detail about the network device C3, then may proceed to other second level networks 20, and may find, for example, network devices instances "A4" and "A5" connected to the network device B1, and network device instance "B6" connected to the network device B2. The DR tool 22 may then continue in this fashion to explore third level networks, fourth level networks, and so forth, until the entire system 10 is analyzed and determined. Alternatively, the DR tool 22 may examine multiple network levels simultaneously, or in parallel. The DR tool 22 may also periodically re-analyze the system 10 and/or monitor the system 10 for predetermined fault conditions.

Figure 2:
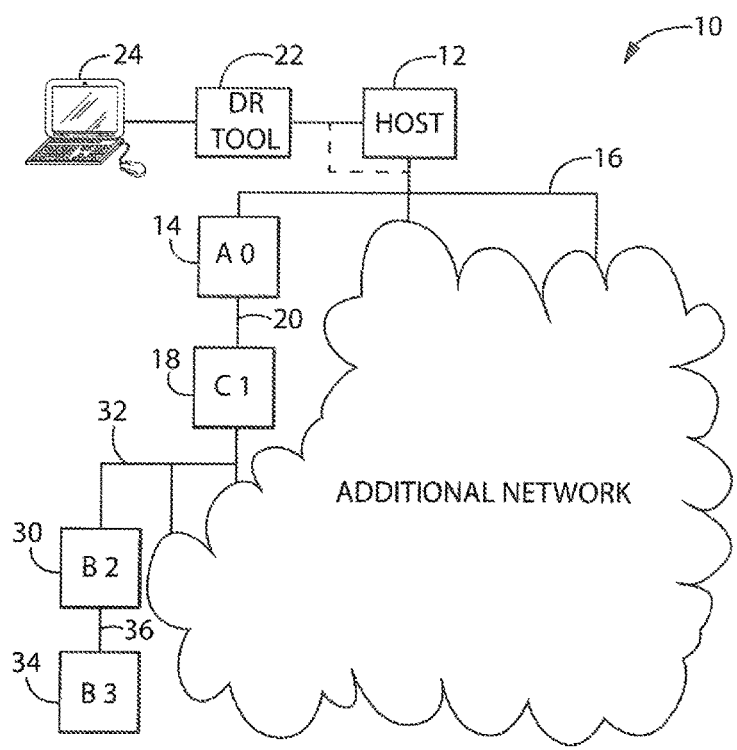
FIG. 2 is a simplified diagram of an industrial network system in accordance with another embodiment of the present invention.

It will be appreciated that the DR tool 22 may analyze and determine various network levels and devices in various sequences and orders at various times. For example, in another embodiment as illustrated in FIG. 2, upon initially analyzing the network device A0 at the first level network 16, and determining the presence of the second level network 20 connected to the network device A0, the DR tool 22 may immediately proceed to analyze the second level network 20 via the network device A0. Accordingly, the DR tool 22 may initially find the second level device 18, illustrated as instance "C1," and may determine the presence of a third level network 32 connected to the network device C1. Accordingly, the DR tool 22 may immediately proceed to analyze the third level network 32 via the network device C1, initially finding a third level device 30, illustrated as instance "B2", and the presence of a fourth level network 36 connected to the network device B2. The DR tool may immediately proceed to analyze fourth level network 36, and so forth, until the path is fully determined, before returning to proceed along different paths.

Figure 3:
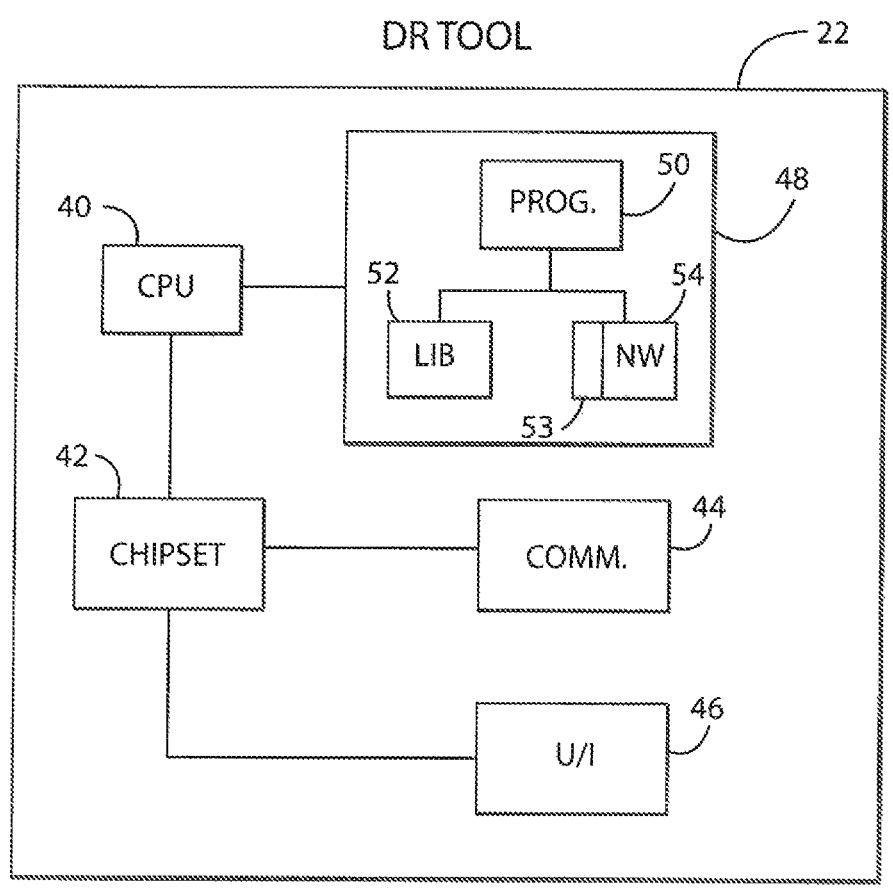
FIG. 3 is a simplified diagram of diagnostic and reliability system or tool for analyzing an industrial control network system in accordance with an embodiment of the present invention.

Referring now to FIG. 3, a simplified diagram of the DR tool 22 for analyzing the system 10 is provided in accordance with an embodiment of the present invention. The DR tool 22 may comprise a Central Processing Unit (CPU) 40 or other processing element or controller in communication with a chipset 42 for interfacing to a communication interface 44 and an optional user interface 46. Alternative embodiments may provide various levels of integration of the CPU 40, the chipset 42, the communication interface 44 and the user interface 46, such as a single microcontroller, Programmable Logic Device (PLD) or other logic element, or distributed semiconductor components. In a preferred embodiment, the DR tool 22 may be a PLC.

The communication interface 44 may implement one or more control network protocols, such as ControlNet, DeviceNet, EtherNet/IP and/or SERCOS, for communicating with the first level network 16. The user interface 46 may implement the same protocol as the communication interface 44, or a different wired or wireless network protocol which may be suitable for communicating with the HMI 24.

The CPU 40 is also in communication with a non-transitory computer-readable storage medium 48, which may be a system memory such as DRAM or Flash memory. The storage medium 48 holds a program 50 for executing the logic of the DR tool 22. The storage medium 48 also holds a library data structure 52, a transaction manager/data logger 53 and a network data structure 54. The library data structure 52 and the network data structure 54 may be local relational databases in communication with the program 50. The transaction manager/data logger 53 may be operable to receive raw data and process or convert such data for network analysis via the network data structure 54. For example, in one aspect, the transaction manager/data logger 53 may collect data from a data table held by the network data structure 54, then convert such data to a form (such as Extensible Markup Language (XML)) which may be transferred to a database of the DR tool 22. In alternative embodiments, it will be appreciated that a variety of distributed computing options may be available for providing the program 50, the library data structure 52, the transaction manager/data logger 53 and/or the network data structure 54, including as described above with respect to FIG. 1, without departing from the spirit of the invention.

Figure 4:
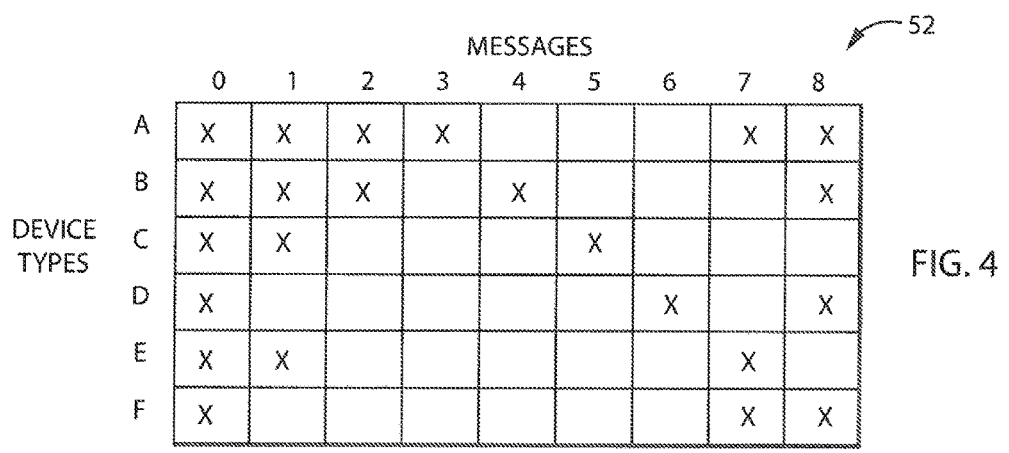
FIG. 4 is a simplified diagram of library data structure used by the diagnostic and reliability tool of FIG. 3.

Referring now to FIG. 4, a simplified diagram of the library data structure 52 used by the DR tool 22 is provided in accordance with an embodiment of the invention. The library data structure 52 relates a plurality of device types, such as device types "A," "B," "C," and so forth, to a plurality of messages, such as message "0," "1," "2." and so forth. As illustrated in FIG. 4, a corresponding "X" indicates whether a message may be configured to be processed by a particular device type. For example, message 0 may be configured to be processed by every device type, whereas message 5 may be configured to be processed only by device type C. Accordingly, some messages may be configured to be processed by a subset of device types, such as message 2, which may be processed by device types A and B, but no others.

Message 0 being configured to be processed by every device type may indicate message 0 as being a generic message. In a CIP compatible system, message 0 may be a generic CIP explicit message containing addressing and service information that directs a receiving device to provide information for identifying a device type, such as an identifying CIP attribute The CIP explicit message could direct a network device to provide a CIP identity object attribute comprising one or more of a Vendor ID, Device Type, Product Code, Revision, Status, Serial Number, Product Name, State, Configuration Consistency Value, Heartbeat Interval, and/or Languages Supported. All CIP compliant devices, regardless of manufacturer, support and respond to such a message requesting a device's CP Identity Object. The CIP Identity Object may provide the aforementioned attributes in support of asset inventorying. For example, message 0 could be a Studio 5000 Logix Designer programmed RSWho message (or "Device WHO"). Generic messages, such as message 0, may be optimal for first communications to target locations (point to point) to direct devices to provide information for identifying a device type.

Alternatively, message 5 being configured to be processed only by device type C may indicate message 5 as being a specific message. In a CIP compatible system, message 0 may be an Add-On Instruction created specifically for devices corresponding to device type C, which may be implemented, for example, in ladder logic code. Add-On Instructions are described, for example, in "Logix5000 Controllers Add-On Instructions," Rockwell Automation Publication 1756-PM010E-EN-P, September 2012, which document is incorporated herein by reference in its entirety. Accordingly, the library data structure 52 may relate Add-On Instructions to CIP device types. Other examples may be messages that could direct a network device to provide a hardware area location including node number or IP address, manufacturing date, product type, device code, hardware description, firmware revision, serial number, major and minor fault flag, slot number and important condition monitoring parameters. Specific messages may also be used to find communication devices connecting to additional network levels. Specific messages, such as message 5, may be optimal for second communications to target locations to direct identified devices to provide information for identifying a device type.

Figure 5:
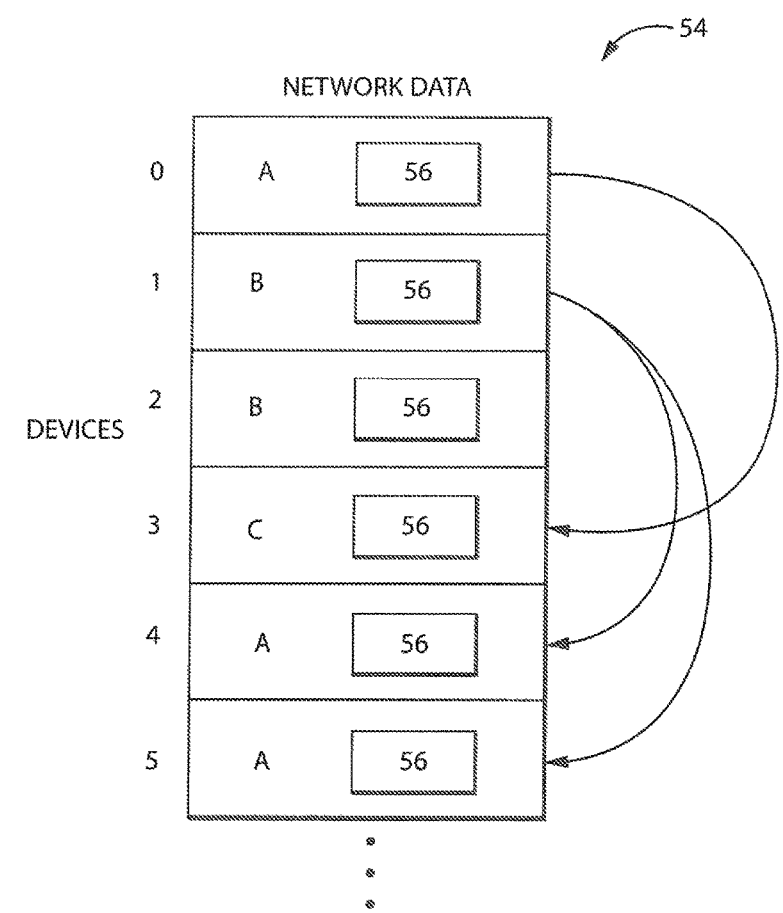
FIG. 5 is a simplified diagram of network data structure used by the diagnostic and reliability tool of FIG. 3.

Referring now to FIG. 5, a simplified diagram of network data structure 54 used by the DR tool 22 is provided in accordance with an embodiment of the invention. Upon receiving a response from a network device, such as in response to the first (generic) communication, an instance number, such as "0," "1," "2," and so forth may be allocated, and each instance may identify a corresponding device type, such as "A," "B" "C," and so forth. For example, instance number 0 may identify device type A. In addition, a response may generate a tag based on the device type which may be used in a second (specific) communication.

Next, upon receiving an additional data value from the network device, such as in response to the second (specific) communication, each instance may be updated to identify a corresponding data value 56. For example, the data value 56 may identify for a particular network device a hardware area location including node number or IP address, manufacturing date, product type, device code, hardware description, firmware revision, serial number, major and minor fault flag, slot number and important condition monitoring parameters. Instances of the network data structure 54 may also be updated to link downstream network devices together. For Example, instance 0 (A0) may link instance 3 (A3) as a downstream network device on next network level as described above with respect to FIG. 1. The data value 56 may also store tags used by the network device, which may then be used by another message for the same or another network device.

Figure 6:
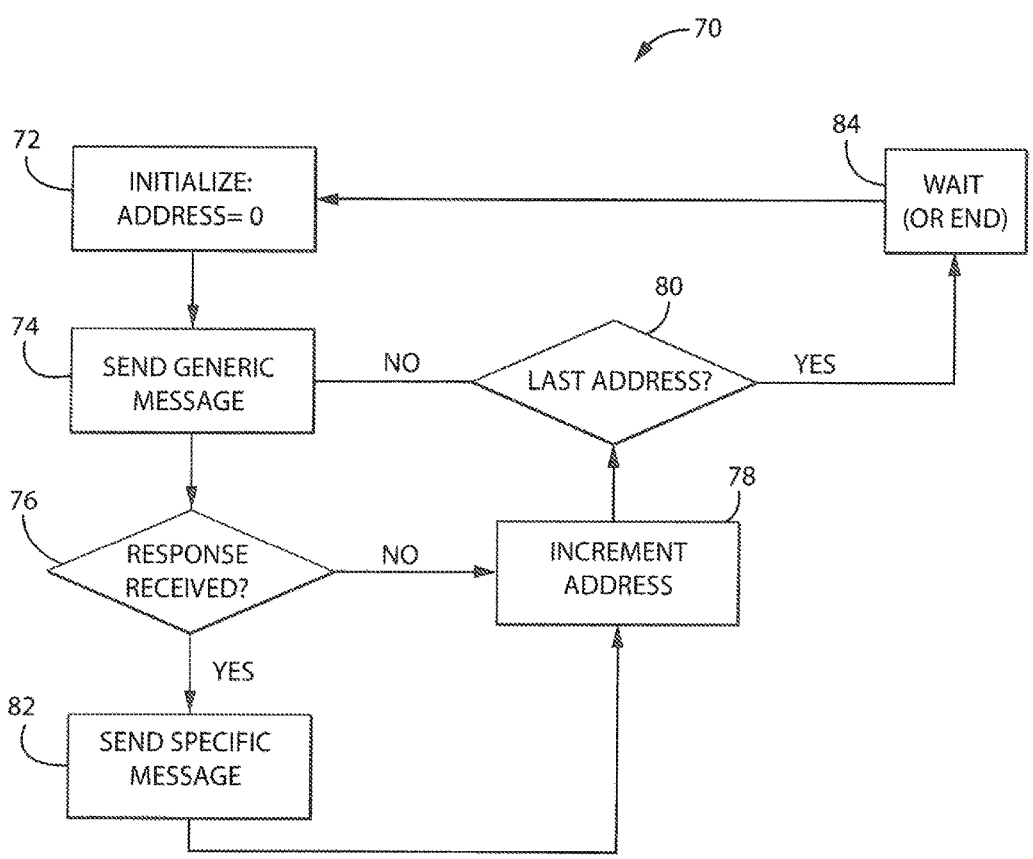
FIG. 6 is a simplified flow diagram of process for analyzing an industrial control network system in accordance with an embodiment of the present invention.

Referring now to FIG. 6, a simplified flow diagram of process 70 for analyzing a control network system is provided in accordance with an embodiment of the present invention. In block 72, the program 50 initializes to the first possible address for the first possible network device at a particular network level, which may be the lowest possible address. An IP address may be used, for example, in systems adhering to Internet Protocol for communication, though alternative addressing schemes, such as node addressing and/or MAC addressing, may also be used. Next, in block 74, the program 50 instructs the processor in the DR Tool 22 to send a first (generic) communication to a particular target location or address. A CIP explicit message, such as RSWho (or "Device WHO"), may be used, for example, in systems adhering to CIP.

In block 76, the program 50, through the DR tool 22, looks for a response from the first communication. If no response is received, the target location is then incremented in block 78, and the program 50 then determines whether the last possible address has been reached in block 80. If the last possible address has not been reached, the program 50 returns to block 74 and again executes to cause the DR Tool 22 to send a first (generic) communication to the next particular target location or address. This loop continues until either a response is received in block 76 or the last possible address is reached in block 80.

If a response is received in block 76, such as from the first level devices 14 over the first level network 16, the program 50 executes in block 82 to instruct the processor in the DR tool 22 to reference a library data structure and send a second (specific) communication that includes a message configured to be processed by a subset of the device types that includes the identified device type. The second communication instructs the network device to provide a data value, such as the data value 56. In addition, the program 50 builds, continues to build and/or updates the network data structure 54 comprising the retrieved information.

Alternatively, if the last possible address is reached in block 80, the program 50 then ends in block 84 having completed an analysis of the network level. The program 50 may wait for a predetermined amount of time then repeat the analysis of the industrial system by returning to block 72. As such, industrial controllers and/or industrial devices added, removed and/or updated periodically throughout the industrial automation environment may be captured. Alternatively, the program 50 may wait to repeat the analysis of the industrial automation environment until directed by a user via the HMI 24.

The process 70 may be repeated at various network levels to analyze a control network system in different ways, including as described above with respect to FIGS. 1 and 2. For example, referring now to FIG. 7 and a simplified flow diagram of process 88, in process in block 90, the program 50 may initialize a network level to zero, thereby reflecting an analysis of a first level network. Next, in block 92, the program 50 initializes to the first possible address for the first possible network device at a particular network level, which may be the lowest possible address. Next, in block 94, the DR Tool 22 sends a first (generic) communication to a particular target location or address. A CIP explicit message, such as RSWho (or "Device WHO"), may be used, for example, in systems adhering to CIP.

In block 96, the DR tool 22 looks for a response from the first communication. If no response is received, the target location is then incremented in block 98, and the program 50 then determines whether the last possible address has been reached in block 100. If the last possible address has not been reached, the program 50 returns to block 94 and again executes to cause the DR Tool 22 to send a first (generic) communication to the next particular target location or address. This loop continues until either a response is received in block 96 or the last possible address is reached in block 100.

If a response is received in block 96, the program 50 may execute in block 102 to instruct the processor in the DR tool 22 to reference a library data structure and send a second (specific) communication that includes a message configured to be processed by a subset of the device types that includes the identified device type. The second communication instructs the network device to provide a data value, such as the data value 56. In addition, the program 50 builds, continues to build and/or updates the network data structure 54 comprising the retrieved information.

Next, in block 104, the program 50 determines whether an additional level network is present. If an additional network level is found to be present, in block 106, the program 50 can save the current network level and current address, and in block 108, may increment the network level by one. The program 50 then returns, for example, to block 92 to initialize to the first possible address for the first possible hardware device at the current network level, and continues to a first (generic) communication to a target address or location until either a response is received in block 96 or the last possible address is reached in block 100, similar to that described above.

If the last possible address is reached in block 100, the program 50 then determines whether the network level is zero in block 110. If the network level is non-zero, as is the case when analyzing an additional network level, the program 50, having now analyzed the additional network level, decrements the network level by one in block 112 and retrieves the previously saved address at the current network level in block 114. The program 50 then returns to block 98 to increment the address level and again determine whether the last possible address has been reached in block 100. Thus, the program 50 may iteratively analyze networks and sub-networks at multiple levels.

If the last possible address is reached in block 100, and the network level is determined to be zero in block 110, thereby indicating the first level network having been analyzed, the program 50 then ends in block 116 having completed an analysis of the control network system. The program 50 may wait for a predetermined amount of time then repeat the analysis of the system by returning to block 92. As such, industrial controllers and/or industrial devices added, removed and/or updated periodically throughout the industrial automation environment may be captured. Alternatively, the program 50 may wait to repeat the analysis of the industrial automation environment until directed by a user via the HMI 24.

Figure 7:
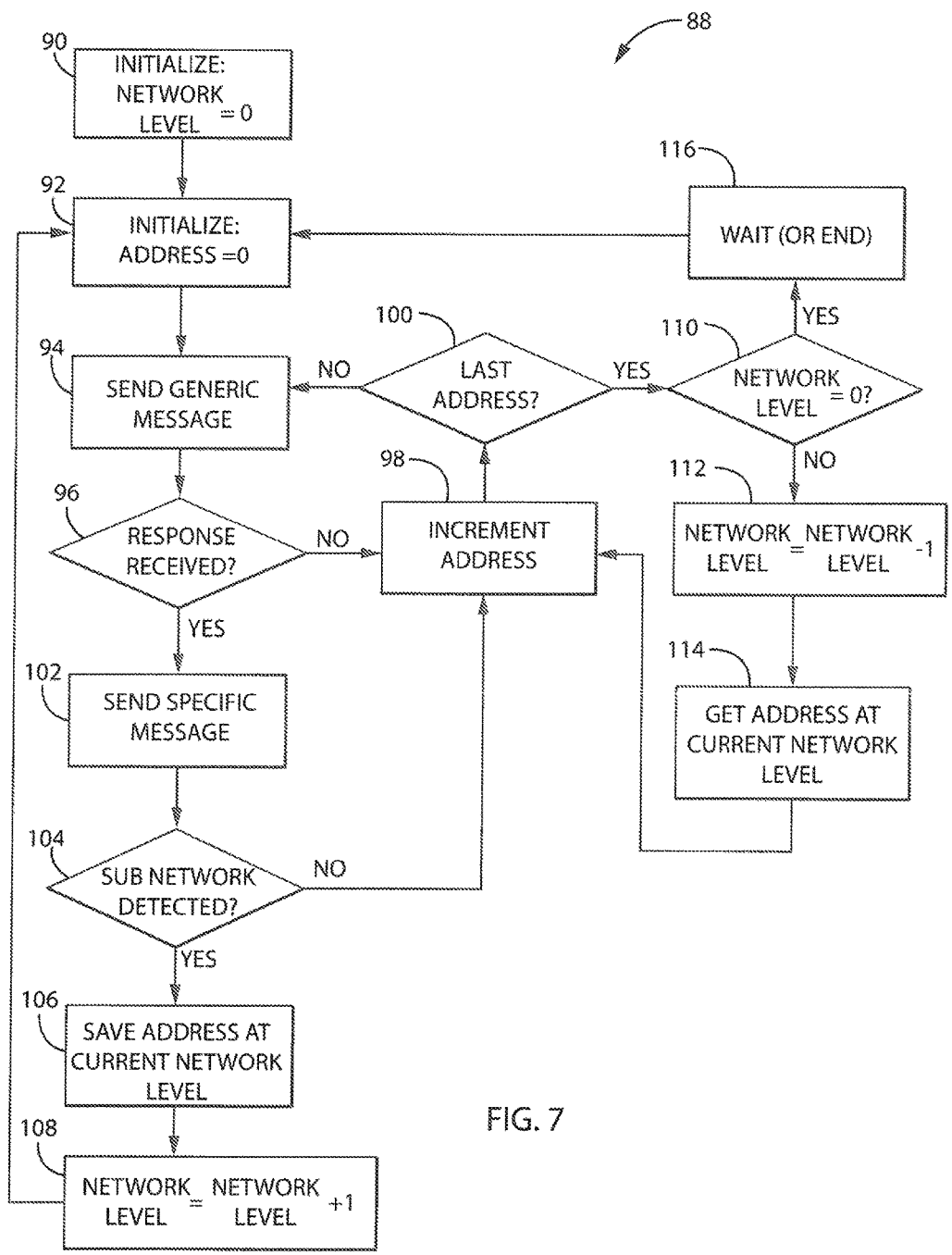
FIG. 7 is a simplified flow diagram of process for analyzing an industrial control network system across multiple network levels in accordance with another embodiment of the present invention.

The DR tool 22 could also be implemented to monitor for hardware failures and for condition monitoring, including as described with respect to FIGS. 5 and 7 of U.S. patent application Ser. No. 13/528,198, titled "Industrial Hardware Installation Base Reporting and Failure Monitoring," incorporated herein by reference.

System for Analyzing an Industrial Control Network

Figure 8:
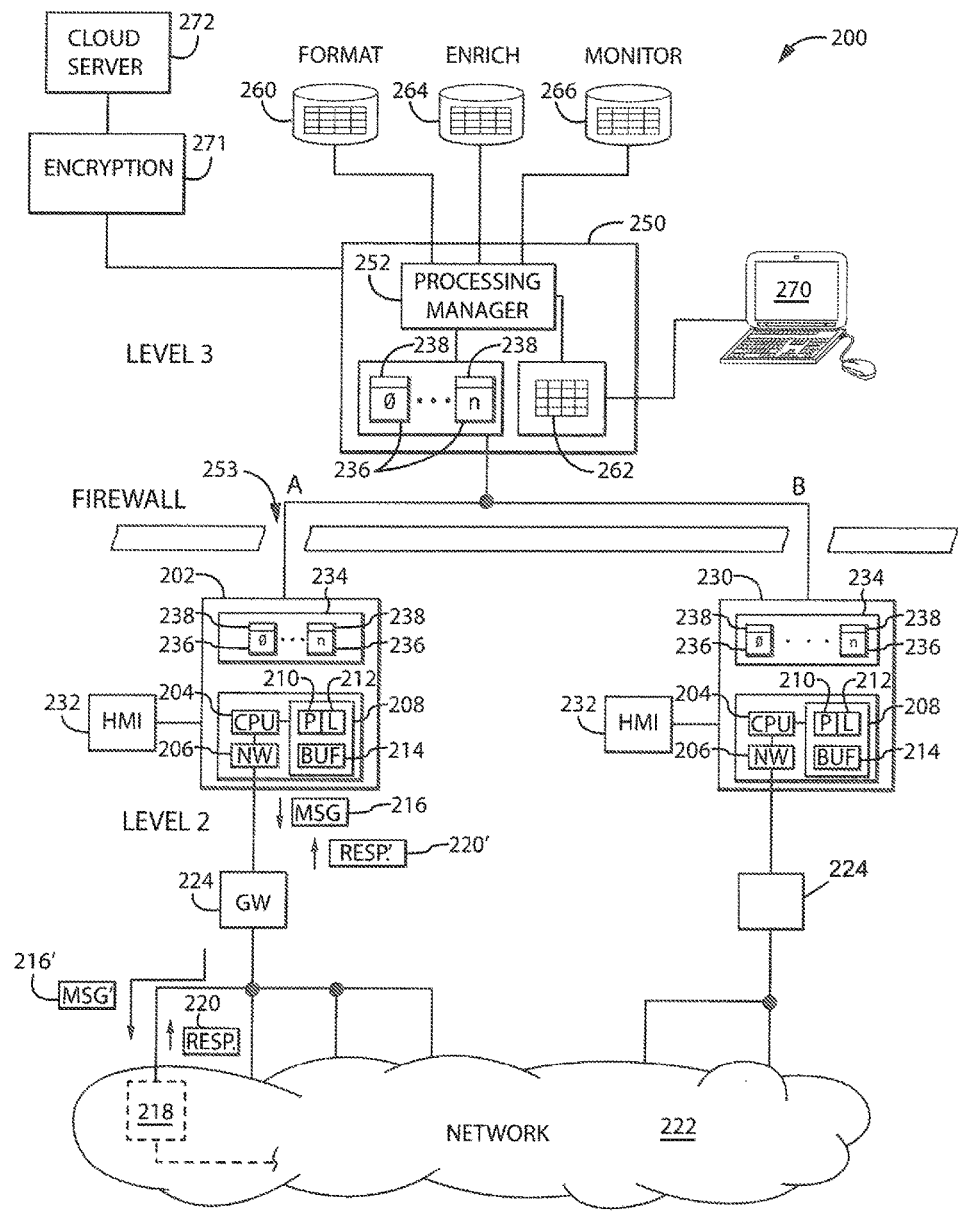
FIG. 8 is a simplified diagram of a system for analyzing an industrial control network in accordance with another aspect of the present invention.

Referring now to FIG. 8, a simplified diagram of a system 200 for analyzing an industrial control network is provided in accordance with another aspect of the invention. The system may include an interrogator 202, which may be a DR system or tool as described above with respect to FIGS. 1-7 and which may be, for example, implemented by an automation controller such as a Programmable Logic Controller (PLC) or a Programmable Automation Controller (PAC), such as a 1756 ControlLogix Control System as available from Rockwell Automation, Inc. The interrogator 202 may include a processor 204, a network interface 206, and a computer readable storage medium 208 for holding a stored program 210, a library 212 and a buffer 214. The network interface 206 may be configured to communicate with multiple device types.

The interrogator 202 may execute the program 210 to send a generic message 216 readable by multiple device types, such as a generic CIP explicit "RSWho" message (or "Device WHO") via unconnected CIP messaging "RSLinx" path (a communication system developed by Rockwell Automation, Inc. for interfacing with a variety of industrial control and automation devices). Device types may include, for example, processors, drives, network cards, I/O modules, servo mechanical systems/motors, network switches, operator interface terminals and the like.

The generic message 216 may be configured to direct a receiving device, such as receiving device 218, to provide a response 220, including one or more parameters, back to the interrogator 202. Parameters contained in the response 220 will typically characterize the receiving device 218. The response 220 could be provided, for example, by way of a CIP identity object including the following mandatory CIP attributes (parameters): Vendor ID, Device Type, Product Code, Revision, Status, Serial Number and Product Name, including as described in "The Common Industrial Protocol (CIP) and the Family of CIP Networks," Copyright 2006, Open DeviceNet Vendor Association, Inc.

The interrogator 202 may send the generic message to multiple network locations to determine presence of a device at each location. For example, the interrogator 202 may send the message 216 to IP address 198.168.1.1 then wait 30 seconds for a response. If no response is received within 30 second, the interrogator 202 may proceed to send the message 216 to a next IP address 198.168.1.2 then wait 30 seconds for a response. If a response is received, the interrogator 202 may store corresponding parameters received from the receiving device 218 (via the response 220) in the buffer 214. The interrogator 202 may continue in this fashion to discover a network 222, including as described with respect to FIGS. 1-7. Possible devices at network locations could include, for example: processors, drives, network cards, I/O modules, servo mechanical systems/motors, network switches, operator interface terminals and the like. Accordingly, any device capable of receiving the generic message and providing a response may be a device at a network location within the scope of the invention.

Moreover, the interrogator 202 may send the message to a device at a target network location, such as the receiving device 218, by communicating the message through one or more intermediate devices 224 for network traffic, such as a gateway or router, at corresponding intermediate network locations. The interrogator 202 may essentially traverse devices and elements, including active chassis backplanes, as part of the data collection process. This allows discovery of deeper network layers, and also allows the interrogator 202 to more conveniently interact directly with a common host, such as a gateway or router. For example, an intermediate device 224 which may be a gateway may receive the message 216 and forward the message 216 (as the message 216') to the receiving device 218. The gateway may then receive the response 220 from the receiving device 218 and forward the response 220 (as the response 220') back to the interrogator 202. The interrogator 202 may communicate messages to target locations through intermediate devices at intermediate network locations in this fashion in order to fully discovery devices on proximal and distal network segments in the network 222.

For faster network discovery, and/or improved simultaneous functionality (such as conducting a broad network discovery while simultaneously monitoring a particular device and its parameters in real time), one or more additional interrogators 230 could also be provided in the system 200. This could essentially allow converging collected data from multiple remote sites in a system. The additional interrogators 230 could be initially connected to the same gateway or router, or alternatively, could be connected to different devices at different locations in the network 222 as illustrated in FIG. 8 (which may advantageously allow network discovery and analysis from different viewpoints of the network 222 while converging toward one another.

The interrogator 202 (and additional interrogators 230) may also include a Human Machine Interface 232. The HMI 232 may allow, for example, configuring, monitoring and controlling network discovery operations via its respective interrogator.

As a response 220 is received from a device at a target location, the interrogator 202 may generate a data record for the responding device. A data record may include the parameters provided by the responding device, such as CIP identity object attributes, in additional to parameters characterizing the responding device's network location, such as an IP address and/or node number, a date/time stamp, and/or parent/child network hierarchy, among other things. In addition, after a response is received, the interrogator may reference the library 212 to determine a specific message to send to the particular type of responding device in order to extract even more information from the responding device for storage as parameters in the data record. The interrogator 202 may then proceed to discover a next device, and generate a next data record, and so forth. A collection of data records may be accumulated in the buffer 214 accordingly, and in one aspect may be a long string file.

After the buffer 214 becomes full, or after the interrogator 202 completes a scan of the network 222, the data records of the buffer 214 may be transferred to a transaction manager 234 as a data set 236. The interrogator 202 may transfer multiple data sets 236 to the transaction manager 234 as the interrogator 202 scans the network. Transfers of data sets 236 may correspond to a scans of different parts of the network 222 (such as for larger networks), or scans of the entire network (such as for smaller networks, periodically updating discovery). The transaction manager 234 queues the data sets 236, and typically assigns a unique identifier 238 to each data set 236 in order to track them.

After the transaction manager 234 receives a new data set 236 (and assigns a unique identifier 238), the transaction manager 234, in turn, sends the data set to a data structure 250 of a processing manager 252. The transaction manager 234 may use File Transfer Protocol ("FTP") or another communication scheme for sending each data set 236. The data structure 250 could be accessed, for example, with Structured Query Language ("SQL") or with Microsoft "Visual Studio LightSwitch" (an extension and framework which may be tailored for creating applications built on .NET technologies and Microsoft platforms) or with other data storage services, and the processing manager 252 may be an engine (may be designed with Microsoft .NET technologies) overlaying the data structure 250 for effectively processing and synthesizing data sets 236 of the data structure 250, which may be stored in a computer readable medium and executed on a processor.

The data structure 250 of the processing manager 252 may communicate with the transaction manager 234 of the interrogator 202 through a defined port 253 in a firewall (identified as port "A"). Similarly, the data structure 250 of the processing manager 252 may also communicate with the transaction manager 234 of the additional interrogators 230 through the same port A and/or separate defined ports in the firewall (such as port "B" as illustrated). The defined port 253 in the firewall could be, for example, configured to SQL server port 1433. Accordingly, such varying arrangements may allow flexibility for implementation of the system 200 for various business environments, including those with firewalls.

The interrogator 202 may communicate at a lower level of communication with devices in the network 222 (for conducting discovery of devices at network locations) than the interrogator 202 communicates with the processing manager 252 (for transferring data sets). Conversely, the processing manager 252 may communicate with the interrogator 202 at a higher level of communication (for transferring data sets) than the interrogator 202 communicates with a device of the network 222 (for conducting network discovery). By way of example, according to the Open Systems Interconnection (OSI) model known in the art for characterizing the communication functions of computing systems, the processing manager 252 may communicate with the interrogator 202 at a "Level 3" (or "Layer 3") type communication, or network layer), while the interrogator 202 may communicate with devices of the network 222 at a "Level 2" (or "Layer 2") type communication or data link layer.

The processing manager 252, in turn, may execute to format the data set 236. A first data set (identified as data set "0") could contain data records for the entire network 222 (such as for a smaller network), or more typically, data records for a portion of the network 222 (such as for a larger network). If data set "0" contains data records for the entire network 222, a next data set "1" may contain updated data records for the network 222 (which may reflect changes of devices or device statuses in the network 222 over time). On the other hand, if the data set "0" contains data records for a portion of the network 222, the next data set "1" may contain a next portion of the network 222 as part of a series of data sets for ultimately providing records for the entire network 222.

For larger networks, data sets 236 may be limited to providing data records for only portions of the network 222 based on buffer size (larger buffers 214 allow storage of more data records and/or more parameters per data record). In addition, or alternatively, data sets 236 may be limited to providing data records for only portions of the network 222 based on an elapsed time, such as generating a data set 236 at least every 30 minutes. Longer delays at nodes in the network 222 may be handled by having more frequent updates of data sets reflecting smaller portions of the network 222 (as opposed to an unreasonably long delay for discovering more or all of the network 222).

The processing manager 252 formats data sets by populating predetermined fields 262 for data records of data sets (including with parameters from the corresponding data records). Predetermined fields 262 may include, for example, serial number, IP address, node number, scan date/time stamp, product number, manufacturer, product name, plant, rack/slot, revision, criticality, major fault, and/or minor fault, among other things. Most typically, at least a first predetermined field will indicate a serial number for a device and a second predetermined field will indicate a network location for the device, such as an IP address. The processing manager 252 may communicate with a format data structure 260 relating known device types to known parameters for determining/resolving parameters of data records for populating the predetermined fields 262.

The processing manager 252 may also communicate with an enrich data structure 264 in order to enrich or augment data records of received data sets with externally derived data. The processing manager 252 may apply a parameter from a data record to identify a device type and related predetermined values in the enrich data structure 264, and then may populate additional predetermined fields 262 with the predetermined values from the enrich data structure 264. For example, a third predetermined field may indicate a current firmware revision number for a device as externally released by the device's manufacturer. Identification of a device type parameter from a data set may allow the processing manager 252 to locate the current firmware revision number as a predetermined value, and then populate a field indicating the current firmware revision number (corresponding to the device type), so that a user may be aware of a firmware obsolete condition.

The processing manager 252 may also communicate with a monitor data structure 266 in order to monitor data sets for one or more predetermined conditions. Predetermined conditions may be user definable with respect to the event being monitored and/or the action taken. Events being monitored (conditions) may include, for example, a change of IP and/or node address, a failure to respond to a message within a designated amount of time (such as 30 seconds), a new device being detected, a firmware revision or other revision detected as being obsolete, a major or minor flag or major or minor fault, a key switch fault (such as a physical key turned to "remote" mode, allowing remote access, as opposed to "run" mode), and the like. Event monitoring may be set with respect to particular device's serial numbers (or asset identifiers) and/or particular locations, and may reflect various levels of criticality. Action taken may range from less severe to more severe, such as from simply queuing a user alert to communicating a message to take one or devices offline. The format data structure 260, enrich data structure 264 and/or monitor data structure 266 may be implemented, for example, as ASP ("Active Server Pages") servers.

The processing manager 252 may also graphically display the predetermined fields 262 to a screen 270 of a workstation or other computer in communication with the processing manager 252. Accordingly, a user may view the screen 270 and make selections to conveniently and reliably capture and maintain the network 222. A user may also redirect the interrogator 202, such as to recapture an area of the network 222, or a particular device 218, including to provide live monitoring of particular parameters.

The processing manager 252 may also communicate, via an encryption pathway 271, with an externally based cloud server system 272. The encryption pathway 271 may provide state of the art encryption, firewall, and/or other security for ensuring proper credentialing and integrity of transmitted communications. Accordingly, the processing manager 252 may securely receive, for example, format data for the format data structure 260, enrich data structure 264 and/or monitor data structure 266, and/or may externally transmit data records, data sets and/or predetermined fields, via the cloud server system 272. Alternatively, the format data structure 260, enrich data structure 264, and/or monitor data structure 266 could be cloud based data structures, as opposed to local data structures receiving data from cloud based sources.

Data Flow

Figure 9:
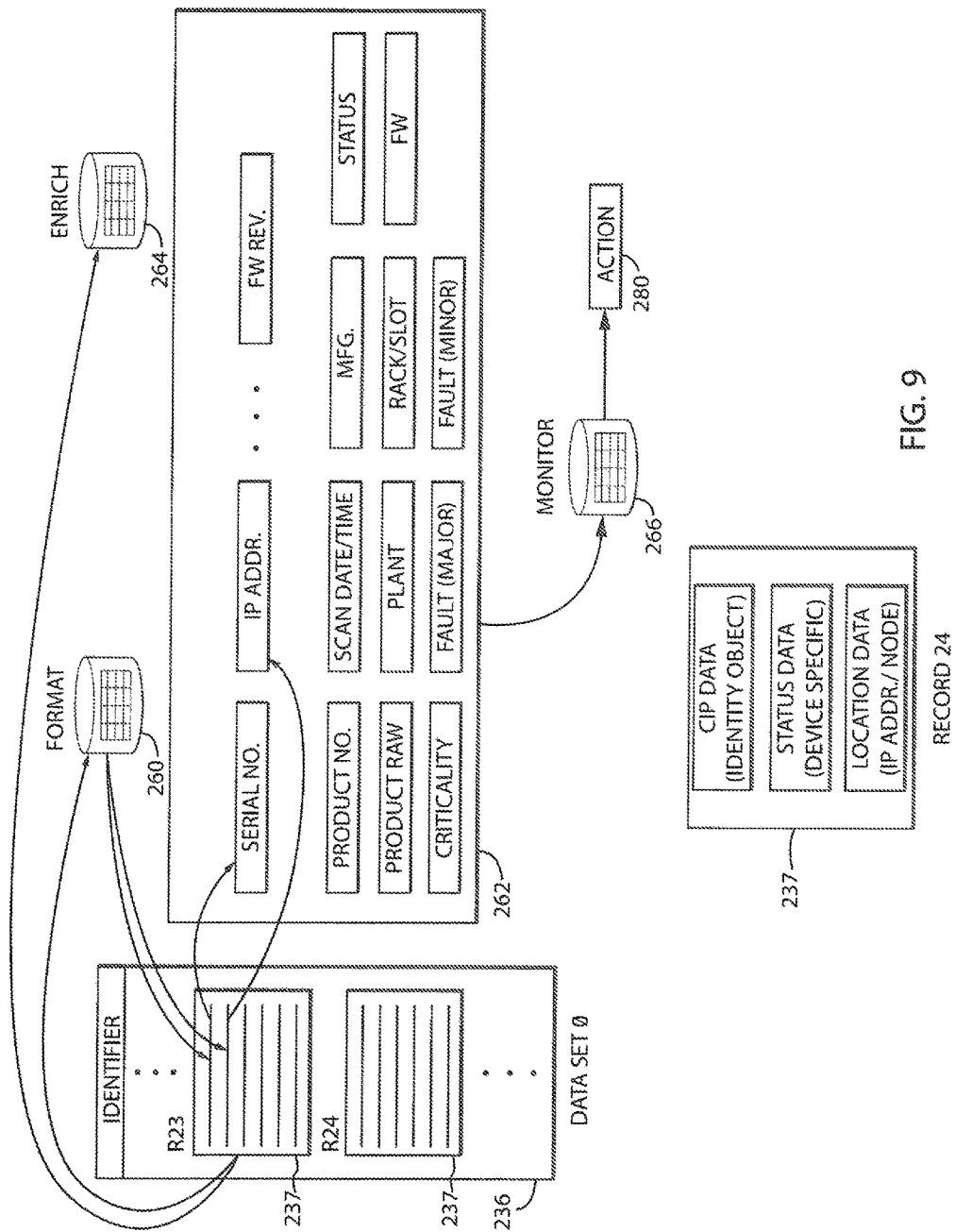
FIG. 9 is a simplified diagram illustrating exemplar data flow in the system of FIG. 8.

Referring now to FIG. 9, a simplified diagram illustrating exemplar data flow in the system of FIG. 8 is provided. An exemplar data set "0" received by the data structure 250 of the processing manager 252 may include numerous data records 237, including for example data records "R23" and "R24" for twenty-third and twenty-fourth discovered devices, respectively. For a particular device, data record 237 may include, for example, parameters of a CIP identity object for the device (obtained from sending the generic message via the interrogator), status data and/or other device specific information for the device (obtained from sending a specific message via the interrogator), and/or location data, such as IP address and/or node number, data/time stamp, parent/child hierarchy, and the like (captured by the interrogator while discovering the device).

The processing manager 252 may communicate with the format data structure 260 to cleanse data records 237 of the data file, such as to remove duplicate information, resolve syntax, identify complete/proper part numbers, and the like. The processing manager 252 may then contextualize the data records 237, such as by dividing the stored information in the data records 237 into segments corresponding to the predetermined fields 262. The predetermined fields 262 may accordingly be populated with the parameters identified in the data record 237.

Next, the processing manager 252 may communicate with the enrich data structure 264 to enrich or augment the data records 237 with externally derived data. The processing manager 252 may apply a parameter (such as device type) from a data record 237 in order to identify a corresponding device type and related predetermined values (such as current firmware revision for the device type). The processing manager 252 may then populate an additional predetermined field 262 with the predetermined value to enrich the formatted data set.

Next, the processing manager 252 may communicate with the monitor data structure 266 in order to monitor data records 237 (and, in turn, data set 0) for one or more predetermined conditions. If a predetermined condition occurs, the processing manager 252 may send take a user definable action 280, such as sending an alert. The predetermined field 262 may be graphically displayed for viewing, selection and interaction by a user.

Figure 10:
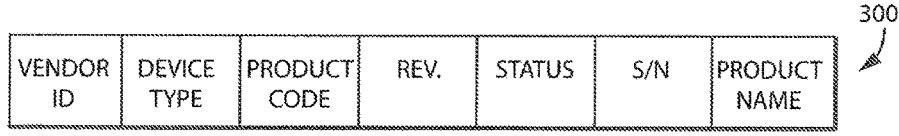
FIG. 10 is a simplified diagram illustrating a response including a plurality of parameters in accordance with an embodiment of the present invention.

Referring now to FIG. 10, a simplified diagram illustrating a response including multiple parameters 300 is provided in accordance with an embodiment of the present invention. The response may include a CIP identity object including the following mandatory CIP attributes (parameters): Vendor ID, Device Type, Product Code, Revision, Status, Serial Number and Product Name.

Figure 11:
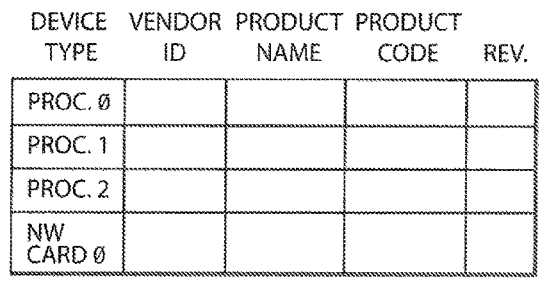
FIG. 11 is a simplified diagram illustrating a data structure which may be used to format a data set in accordance with an embodiment of the present invention.

Referring now to FIG. 11, a simplified diagram illustrating a data structure 320 is provided in accordance with an embodiment of the present invention. The data structure 320 may be held by the format data structure 260 and may be used by the processing manager 252 to format data records of data sets into the predetermined fields 262. The data structure 320 may relate, for example, known device types, such as known "processor 0," "processor 1," "processor 2," "network card 0," and so forth, to corresponding known parameters, such as "vendor ID," "product name," "product code," and "revision." Accordingly, the processing manager 252 may compare parameters received from devices to the data structure 320 in order to facilitate the aforementioned cleansing, de-duplication, syntax resolution, part numbering, and the like steps.

Figure 12:
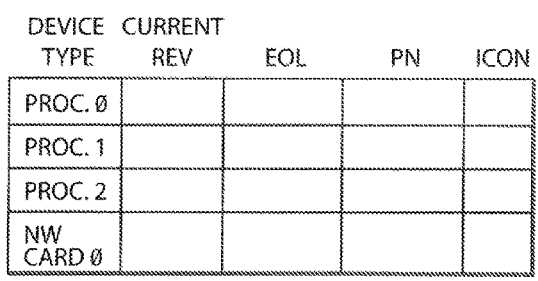
FIG. 12 is a simplified diagram illustrating a data structure which may be used to enrich a data set in accordance with an embodiment of the present invention.

Referring now to FIG. 12, a simplified diagram illustrating a data structure 330 which may be used to enrich a data set is provided in accordance with an embodiment of the present invention. The data structure 330 may be held by the enrich data structure 264 and may be used by the processing manager 252 to enrich data records of data sets via additional predetermined fields 262. The data structure 330 may relate, for example, known device types, such as known "processor 0," "processor 1," "processor 2," "network card 0," and so forth, to predetermined values for augmenting information about devices, such as a "current revision" for firmware, a planned "end of life" date, a suggested upgrade "part number," an associated icon for the device, and the like. Accordingly, the processing manager 252 may compare one or more parameters received from devices (such as a device type parameter) to the data structure 330 (such as corresponding device types) in order to locate and display one or more related predetermined values in additional predetermined fields.

Figure 13:
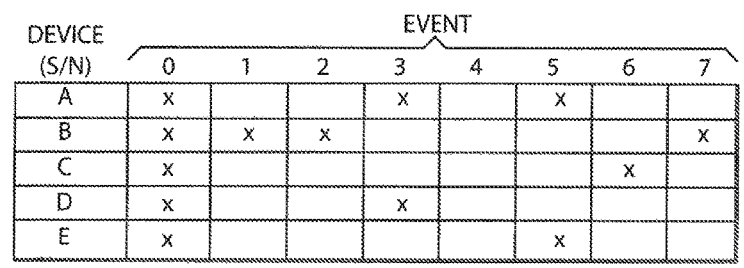
FIG. 13 is a simplified diagram illustrating a data structure which may be used to monitor the network in accordance with an embodiment of the present invention.

Referring now to FIG. 13, a simplified diagram illustrating a data structure 340 which may be used to monitor the network is provided in accordance with an embodiment of the present invention. The data structure 340 may be held by the monitor data structure 266 and may be used by the processing manager 252 to monitor data records (and/or data sets) for one or more predetermined conditions. The data structure 340 may relate, for example, located devices in the network 222, such as device "A" (from data record "A"), device "B" (from data record "B"), device "C" (from data record "C"), and so forth, to predetermined conditions, such as condition or event "0," condition or event "1," condition or event "2," and so forth. Examples of predetermined condition or events include: a change of IP and/or node address, a failure to respond to a message within a designated amount of time (such as 30 seconds), a new device being detected, a firmware revision or other revision detected as being obsolete, a major or minor flag or major or minor fault, a key switch fault (such as a physical key turned to "remote" mode, allowing remote access, as opposed to "run" mode), and the like. Action taken may range from less severe to more severe, such as from simply queueing a user alert to communicating a message to take one or devices offline.

For example, as illustrated in FIG. 13, the processing manager 252 may monitor all devices for predetermined condition or event "1," which may be a major flag or fault, however, the processing manager 252 may only monitor devices A and D for predetermined condition or event "3." which may be a failure to respond to a message within 60 seconds. Moreover, an action taken with respect to event 1 occurring may be to instruct the corresponding device to go offline, whereas an action taken with respect to event 3 occurring may be to send a user alert.

Process Flow

Figure 14:
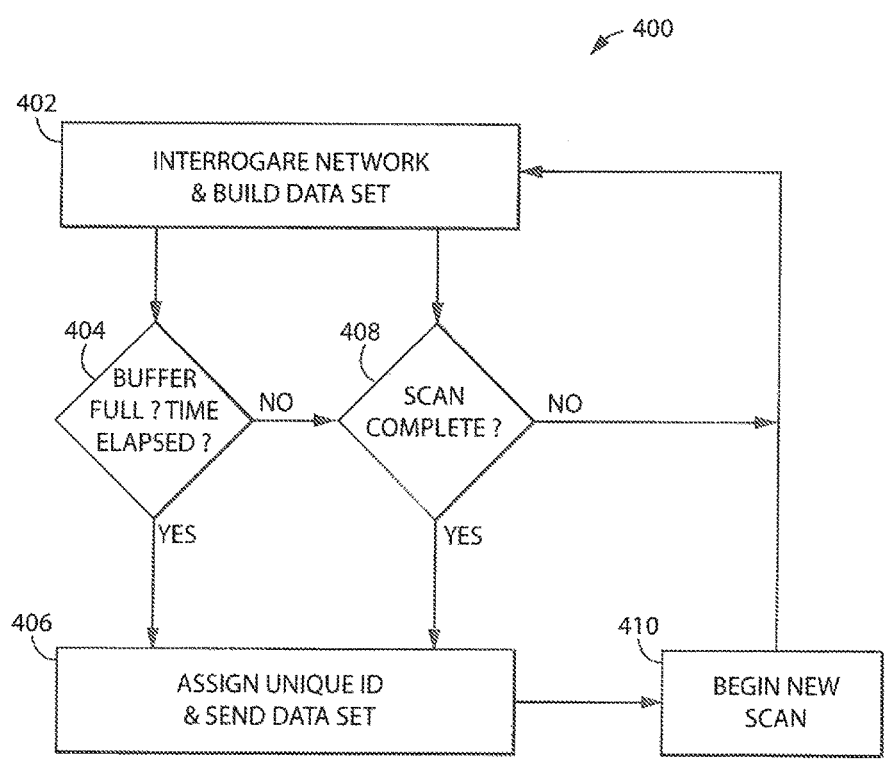
FIG. 14 is a simplified flow diagram of process for collecting data sets in another aspect of the present invention.

Referring now to FIG. 14, a simplified flow diagram of a process 400 for collecting data sets is provided in another aspect of the present invention. At process block 402, an interrogator having a network interface is configured to communicate with multiple device types. The interrogator is operable to send a generic message readable by each of the multiple device types. The generic message is configured to direct a device to provide a response including one or more parameters which may characterize the device. The interrogator is further operable to send the generic message to multiple network locations to determine presence of a device at each network location (testing for the presence of devices). As a device responds with its parameters, the interrogator builds a data record for the device, filling a local buffer of the interrogator. Building a data record for a device may further include sending one or more subsequent (follow-on) more specific messages to the device to extract even further parameters characterizing the device.

Once a device is captured and its parameters are stored as a data record in the buffer, in decision block 404, the interrogator next determines if the buffer is full and/or if a predetermined time has elapsed. If the buffer is full (yes), or if a predetermined time has elapsed (yes), the process 400 continues to process block 406 in which the interrogator transfers the contents of the buffer to a transaction manager as a data set. However, if the buffer is not full (no), and/or the predetermined time has not elapsed (no), the interrogator may instead proceed to decision block 408 to determine if the current scan of the network is complete (and the network fully discovered). The scan of the network may be complete if there are no network locations remaining to be tested, whether at a current network level or one or more deeper network levels. If the scan of the network is not complete ("no"), the interrogator returns to process block 402 to locate a next device, continuing to build a next data record, and continuing to the fill the buffer. However, if the scan of the network is complete ("yes"), the process 400 may continue to process block 406 in which the interrogator transfers the contents of the buffer to the transaction manager as a data set.

At process block 406, the transaction manager assigns a unique identifier to the data set. The transaction manager then sends the uniquely identified data set to data structure (such as a SQL server) and processing manager executing with respect to the data structure. The processing manager may then, in turn, communicate with the data structure to forma the data set, including by populating multiple predetermined fields for each data record. The process 400 may continue to process block 410 at which point a new scan of the network may be initiated for updating the contents of the previous scan.

Figure 15:
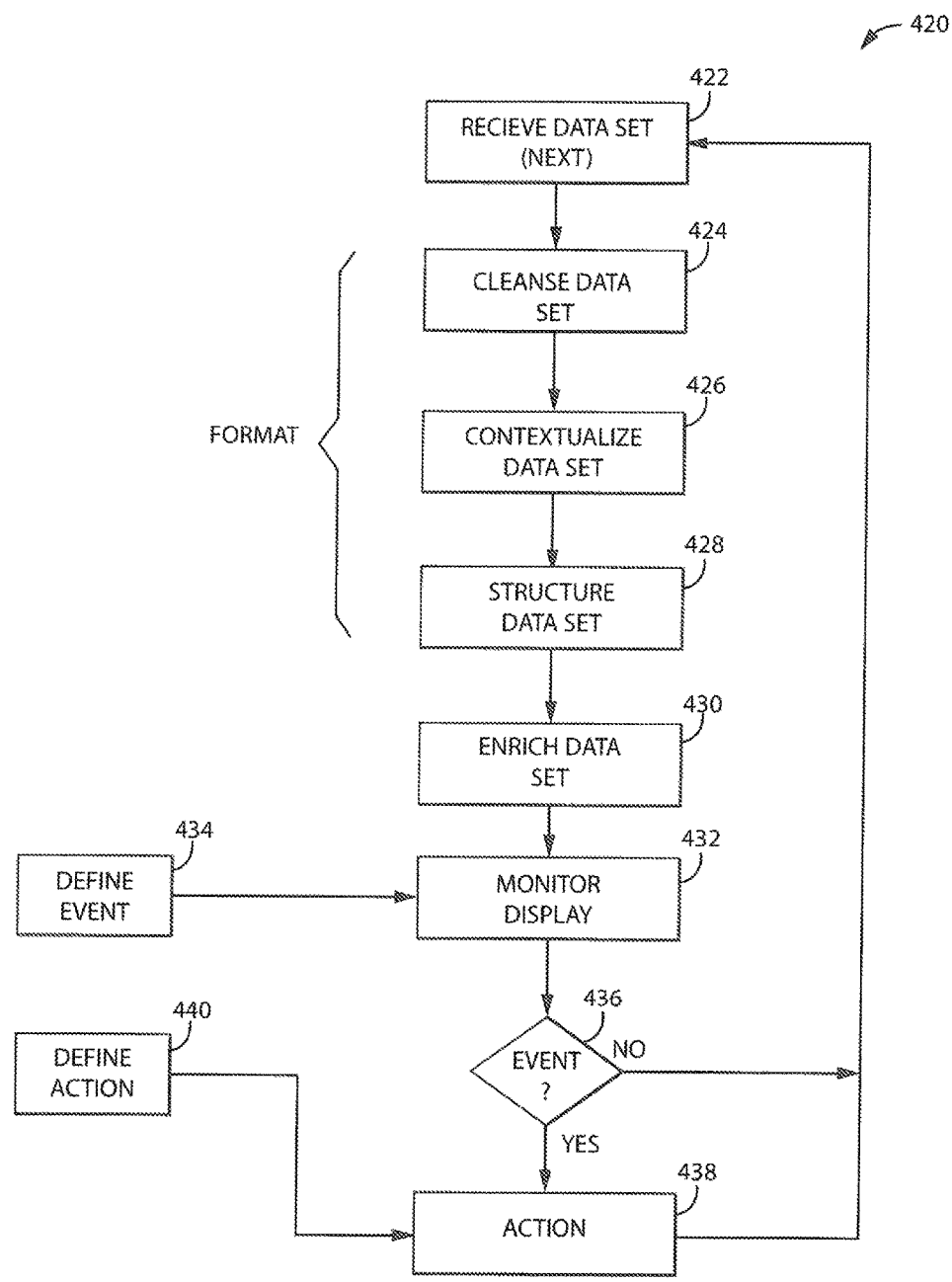
FIG. 15 is a simplified flow diagram of process for characterizing data sets in another aspect of the present invention.

Referring now to FIG. 15, a simplified flow diagram of process 420 for characterizing data sets is provided in another aspect of the present invention. In process block 422, the data structure (which may be SQL server) receives a uniquely identified data set from the transaction manager of the interrogator. Next, in process blocks 424, 426, and 428, the processing manager executing with respect to the data structure may proceed to format the data set. For example, in process block 424, the processing manager may cleanse the data set, such as by removing duplicate information, resolving syntax, identifying complete/proper part numbers, and the like. In process block 426, the processing manager may contextualize the data set, such as by dividing stored information in the data records into segments corresponding to predetermined fields. In process block 428, the processing manager may structure the data set by organizing the predetermined fields.

Next, in process block 430, the processing manager may enrich the data set, and correspondingly, the predetermined fields, with externally derived data. For example, the processing manager may determine a current firmware revision number for a device of the data record, and populate a predetermined field for displaying the current firmware revision number.

Next, in process block 432, the processing manager may graphically display the formatted data set as predetermined fields grouped by a corresponding device. A user may interact with the graphical display and predetermined fields in order to extract more information. In process block 432, the processing manager may also monitor the data set, and correspondingly, the predetermined fields, for each of the devices for one or more predetermined conditions or events. In process block 434, user definable predetermined events may be provided to the process manager for the monitoring.

In decision block 436, if a predetermined event is determined by the processing manager to have occurred, the process 420 may continue to process block 438 for action. The predetermined event may include instructions for the corresponding action. Alternatively, in process block 440, user definable predetermined actions may be provided to the process manager for the action. Actions may include, for example, queuing and sending an alert, sending a message to take a device offline, and so forth.

If a predetermined event is not determined to have occurred in decision block 436, or after an action has been taken in process block 438, the process 420 may return to the process block 422 for each new data set received. Data sets may be received as part of a series of data sets which cumulatively characterize a network. Data sets may also be received as updates to previously determined and monitored devices in order to inspect for changes in the network.

Graphic Display

Figure 18:
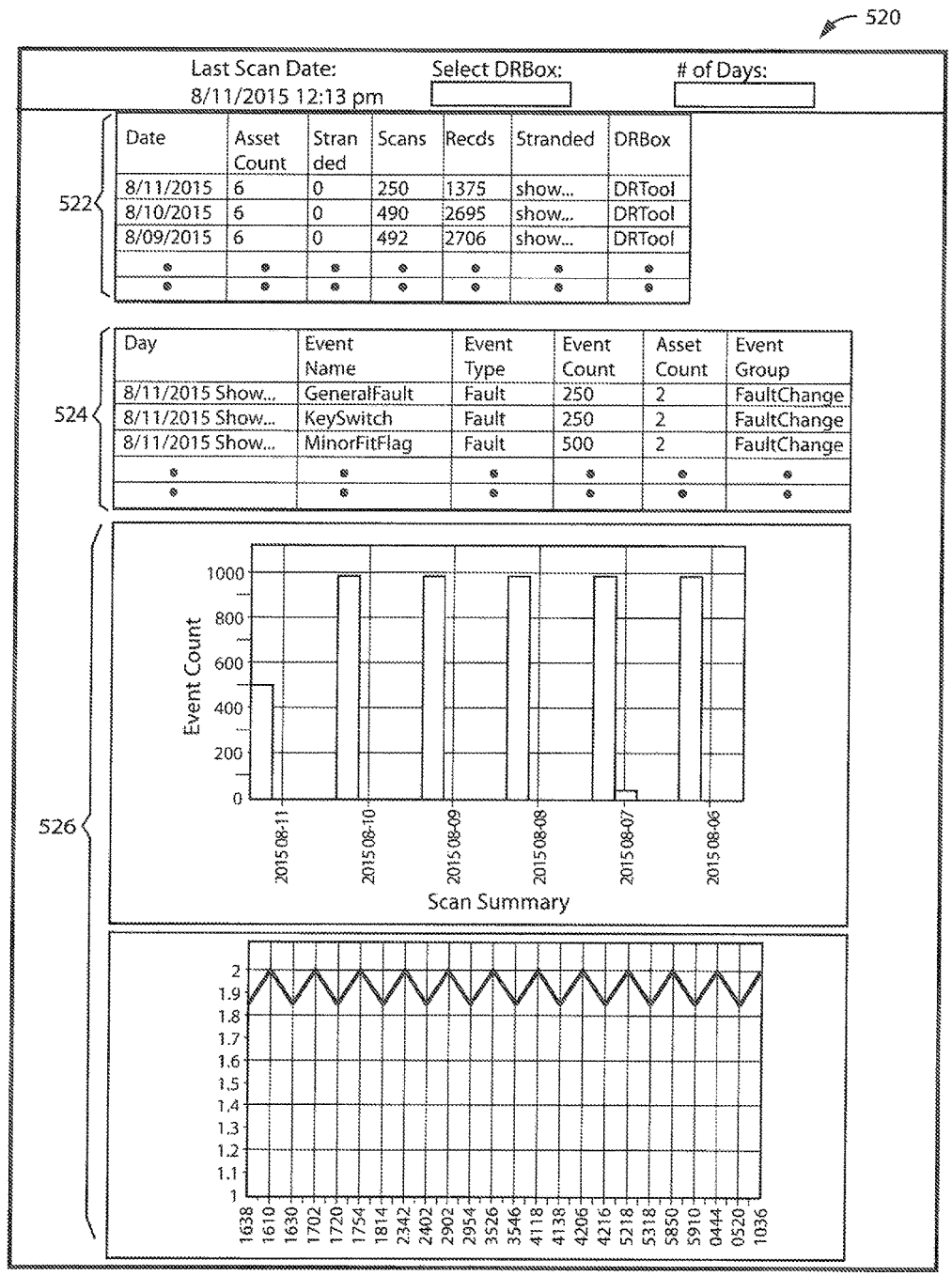
FIG. 18 is a graphical display for illustrating scan data in an aspect of the present invention.

Referring now to FIGS. 16-18, various graphical displays are provided which could be displayed, for example, to the screen 270, via the processing manager 252, to analyze the network 222 using the interrogator 202, as described above with respect to FIGS. 8-15. In FIG. 16, a first graphical display 460 for illustrating networking data is provided. In a first panel 462 of the first graphical display 460, a comprehensive listing of devices discovered (or scanned) in the network may be displayed. Each row may indicate a discovered device having a data record produced as part of a data set from an interrogator. Each column may indicate a predetermined field corresponding to the device, populated by the processing manager. In the first panel 462, exemplar predetermined fields may include a serial number for a device, a revision number for the device (such as a detected firmware revision number), a criticality of the device (which may be configured as a parameter by a user upon deployment in the network), an IP address (for where the device was located), and raw product information which may further characterize the device. These predetermined fields will typically be populated by parameters from corresponding data records for the devices, though the IP Address field will typically be provided by the interrogator according to where the device was located.

In a second panel 464, more detailed information focused for a particular device selected from the listing in the first panel 462 may be displayed. The second panel 464 may include additional predetermined fields populated with parameters from data records, from the interrogator and/or from predetermined values enriching the data set. By way of example, shown in the second panel 464 are a serial number 466 ("Asset") of a particular device being further examined, the last date/time 468 the device was scanned, raw product information 470 received from the device, a determined product number 472 for the device, maintenance information 474 for the device (including plant location, criticality, device location, scan frequency setting, time to inactive state, and date/times of last event fault, first scan, last ID change, last location change, and deactivation), scan statistics 476, and scan details 478 (scan type, scan time, major faults detected, minor faults detected, general information and node address).

Turning now to FIG. 17, a second graphical display 500 for illustrating event monitoring is provided. In the second graphical display 500, multiple events are listed in priority order with upper rows corresponding to higher priority events being monitored and lower rows corresponding to lower priority events being monitored. Multiple predetermined events are identified according to "event names," such as a "Faulted Processor Past" event, or a "Minor Fault Flag" event, and the interrogator ("DR Tool") being used to monitor for the corresponding event also is identified ("DR Box ID"). Each predetermined event may also indicate an "event type" for monitoring, such as a "fault" (fault being reported or detected) "inactive" (device goes inactive or does not respond), "config." (device changes a configuration setting), "new" (device is newly discovered over a previous scan), and "ID" (a same device changes with respect to its network location). In addition, the average time duration in milliseconds may also be provided for event occurrences.

Turning now to FIG. 18, a third graphical display 520 for illustrating scan data is provided. In a first area 522, a summary of network scans over time is illustrated. For example, on the date 8/9/2015, the network was scanned 492 times, capturing 2706 separate data records (devices). Then, on the date 8/10/2015, the network was scanned 490 times, capturing 2695 separate data records (devices). Then, on a present date of 8/11/2015 at 12:13 PM, the network was scanned 250 times, capturing 1375 separate data records (devices), which is approximately on pace to the average from the previous days.

In a second area 524, more detailed information can be provided for a particular scan date. For example, scans on the present scan date 8/11/2015 may be listed with each predetermined event which has occurred being shown (such as a "General Fault," a "Key Switch" fault, and a "Minor Fault Flag"). Finally, in a third area 526, scan statistics for the network may be shown, including, for example, by a bar chart illustrating total events occurring by date.

Certain terminology is used herein for purposes of reference only, and thus is not intended to be limiting. Such terminology may include the words specifically mentioned above, derivatives thereof, and words of similar import. For example, the terms "first," "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor," and "a processor" or "a CPU" can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A system for analyzing an industrial control network, comprising:
   an interrogator having a network interface configured to communicate with a plurality of device types, the interrogator executing a program stored in a non-transient medium to discover a first-level device on a first-level network by sending a generic message readable by each of the plurality of device types, the generic message being configured to direct a device to identify its device type, then send a specific message to the first-level device based on the device type to discover a second-level network connected to the first-level device, then discover a second-level device on the second-level network by sending a generic message readable by each of the plurality of device types via the first-level device, wherein each message is configured to direct a device to provide a response including a plurality of parameters, and wherein each generic message is sent to a plurality of network locations to determine presence of a device at each network location; and
   a processing manager in communication with the interrogator, the processing manager executing a program stored in a non-transient medium operable to:
   receive a plurality of data records from the interrogator, each data record including a plurality of parameters for each device providing a response, the plurality of data records forming a data set;
   format the data set by populating a plurality of predetermined fields for each data record, the plurality of predetermined fields including a first field indicating a parameter for a device of a data record and a second field indicating a network location for the device of the data record; and
   graphically display the predetermined fields.

2. The system of claim 1, wherein the parameter indicated by the first field is a serial number for the device, and the network location indicated by the second field is an Internet Protocol (IP) address for the device.

3. The system of claim 1, further comprising a data structure relating a plurality of predetermined values to the plurality of device types, wherein the processing manager is further operable to communicate with the data structure to identify a device type and a related predetermined value according to a parameter for a device of a data record.

4. The system of claim 3, wherein the plurality of predetermined fields include a third field, and further comprising the processing manager being operable to format the data set by populating the third field indicating the related predetermined value for each device.

5. The system of claim 1, further comprising the processing manager being operable to monitor the data set for a predetermined condition.

6. The system of claim 1, wherein the generic message is a Common Industrial Protocol (CIP) explicit message containing addressing and service information directing a receiving device to provide information for identifying a device type, and wherein the response provides a CIP identity object, and the plurality of parameters are attributes of the CIP identity object.

7. The system of claim 1, wherein the processing manager communicates with the interrogator through a defined port in a firewall.

8. The system of claim 7, wherein the processing manager communicates with the interrogator at a higher level of communication than the interrogator communicates with a device.

9. The system of claim 1, wherein the interrogator includes a transaction manager operable to send the data set to the processing manager, and wherein the transaction manager assigns a unique identifier to the data set.

10. The system of claim 9, wherein the interrogator periodically generates new data sets, and wherein the transaction manager sends new data sets to the processing manager with unique identifiers.

11. The system of claim 1, wherein the first-level device is a gateway or a router, and the second-level device is at least one of: a processor, a drive, a network card, and an I/O module.

12. The system of claim 1, wherein the interrogator is an automation controller.

13. The system of claim 1, further comprising a library data structure relating messages to a plurality of device types, wherein the specific message is determined from the library data structure for a device type determined from the generic message.

14. A method for analyzing an industrial control network including an interrogator having a network interface configured to communicate with a plurality of device types, the interrogator executing a program stored in a non-transient medium to discover a first-level device by sending a generic message readable by each of the plurality of device types, the generic message being configured to direct a device to identify its device type, then sending a specific message to the first-level device based on the device type to discover a second-level network connected to the first-level device, then discover a second-level device on the second-level network by sending a generic message readable by each of the plurality of device types via the first-level device, wherein each message is configured to direct a device to provide a response including a plurality of parameters, and wherein each generic message is sent to a plurality of network locations to determine presence of a device at each network location, and a processing manager in communication with the interrogator, the method comprising:
   receiving a plurality of data records from the interrogator, each data record including a plurality of parameters for each device providing a response, the plurality of data records forming a data set;
   formatting the data set by populating a plurality of predetermined fields for each data record, the plurality of predetermined fields including a first field indicating a parameter for a device of a data record and a second field indicating a network location for the device of the data record; and
   graphically displaying the predetermined fields.

15. The method of claim 14, further comprising communicating with a data structure relating a plurality of predetermined values to the plurality of device types to identify a device type and a related predetermined value according to a parameter for a device of a data record.

16. The method of claim 15, wherein the plurality of predetermined fields include a third field, and further comprising formatting the data set by populating a third field indicating the related predetermined value for each device.

17. The method of claim 14, further comprising monitoring the data set for a predetermined condition.

18. The method of claim 14, wherein the interrogator includes a transaction manager operable to send the data set to the processing manager, and further comprising the interrogator periodically generating a new data set, and the transaction manager sending each new data set to the processing manager with a unique identifier.

* * * * *